United States Patent
Fraim et al.

(10) Patent No.: US 8,945,353 B1
(45) Date of Patent: Feb. 3, 2015

(54) ELECTROLYTIC CELL WITH ADVANCED OXIDATION PROCESS

(75) Inventors: Michael Fraim, College Station, TX (US); Sanjeev Jakhete, Stuart, FL (US)

(73) Assignee: Global Water-Holdings, LLC, Wilmington, DE (US)

( * ) Notice: Subject to any disclaimer, the term of this patent is extended or adjusted under 35 U.S.C. 154(b) by 112 days.

(21) Appl. No.: 13/333,413

(22) Filed: Dec. 21, 2011

(51) Int. Cl.
C02F 1/461 (2006.01)
C02F 1/467 (2006.01)

(52) U.S. Cl.
CPC ............ *C02F 1/46104* (2013.01); *C02F 1/4672* (2013.01); *C02F 2301/024* (2013.01); *C02F 2201/4611* (2013.01)
USPC .......................... 204/232; 204/275.1; 204/272

(58) Field of Classification Search
None
See application file for complete search history.

(56) References Cited

U.S. PATENT DOCUMENTS

| | | | | |
|---|---|---|---|---|
| 4,714,534 A | * | 12/1987 | Fair et al. | 204/269 |
| 5,993,749 A | * | 11/1999 | Adams | 422/186.3 |
| 6,054,097 A | * | 4/2000 | Mass et al. | 422/24 |
| 6,382,601 B1 | * | 5/2002 | Ohnari | 261/79.2 |
| 7,491,453 B2 | * | 2/2009 | Logan et al. | 429/2 |
| 2010/0320147 A1 | * | 12/2010 | McGuire et al. | 210/638 |

* cited by examiner

*Primary Examiner* — Harry D Wilkins, III
(74) *Attorney, Agent, or Firm* — Daniel S. Polley, P.A.

(57) ABSTRACT

An apparatus and method for electrolytically treating water which can include the influent inlet arrangements for cavitation and one or more pairs of electrodes. The electrodes can be suitable for a continuous anodic and cathodic operation for treating water. The pressurized influent premixed with oxidant gas, such as, but not limited to, Ozone or Oxygen can be pumped into the reactor vessel through the mixing nozzles preferably arranged radially along the circumference. A power source for each reactor provides voltage and current to the electrodes. The controller maintains the voltage and current to the electrode. The duration of each voltage polarity applied to each electrode can be preferably the same. The polarity of the voltage to the electrode can be periodically reversed at a set interval.

20 Claims, 10 Drawing Sheets

ELECTRO-CHEMICAL CELL PROCESS

ELECTRO-CHEMICAL
CELL REACTOR

ELECTRO-CHEMICAL CELL PROCESS

FIG:3

ELECTROLYTIC CELL

CROSS SECTIONAL VIEW
OF ELECTROLYTIC CELL

TOP CROSS SECTIONAL VIEW
OF ELECTRO-CHEMICAL CELL.

END VIEW OF ELECTROLYTIC CELL

TOP VIEW: ADVANCED OXIDATION PROCESS USING ELECTROCHEMICAL CHAMBER AND REACTOR PIPE

FRONT VIEW: ADVANCED OXIDATION PROCESS USING ELECTROCHEMICAL CELL AND REACTOR PIPE.

ADAVANCED OXIDATION PROCESS WITH
ELECTRO-CHEMICAL CELL AND REACTOR PIPE

ELECTROLYTIC CELL WITH ADVANCED OXIDATION PROCESS

FIELD OF THE INVENTION

The present invention relates generally to the field of water treatment and more particularly to the recovery of ammonia and urea in processed sewage water, agriculture runoff water and industrial wastewater through the use of an electrolytic reactor cell.

BACKGROUND OF THE INVENTION

Electrolysis is a process whereby the electric current is used to promote the decomposition of contaminants in the influent. The use of an electrolytic cell in water treatment industry is known for years. These applications include production of required oxidants in the process and use them to eliminate harmful and unwanted organism. Most modern sewage treatment facilities and modern agriculture mature treatment facilities are using an initial anaerobic solids digestion step to generate methane gas to generation equipment to power the facility. A byproduct of the methane generation from organic materials is ammonia generation from urea and other organic nitrogen compounds in the effluent.

A problem with electrolytic base water treatment equipment is scale build up on electrode surface. As the treatment progresses, chemical fouling occurs due to oxidation reaction occurring at the anode and reduction reaction occurring at the cathode. The scale and fouling build up in the reactor requires higher current to maintain the same potential across the electrodes.

The present invention is directed to overcoming these issues.

SUMMARY OF THE INVENTION

Generally, the present invention relates to recovering ammonia and urea from processed sewage water and industrial wastewater. The ammonia ion is concentrated in the cathode compartment of an electro-chemical cell. The pH of the cathode compartment can be maintained above 10 to convert ammonium ion to ammonia gas. Hardness salts precipitated on the cathode surface are removed by turbulence created by cavitation. Optional generation of bleach on an anode can be used to convert ammonia to nitrogen gas and an optional addition of ozone in the anode can be used to increase organic destruction rates. The present invention device can be used to sterilize the effluent using anode, cathode and hydrodynamic cavitation. The high turbulence in the reactor enhances the mass transfer efficiencies leading to efficient degradation of the ammonia in the wastewater.

To enhance the performance of the electro-oxidation process and to eliminate the scaling and fouling of the reactor, the following preferred approach can be used:
1) Providing for a high turbulence entry of the influent into the reactor;
2) Alternating the polarity of the electrode(s) at certain intervals; and/or
3) Subjecting the influent to hydrodynamic cavitation, which allows for high cavitation energy dissipation. The cavitation energy is utilized to breakdown the organic contaminants and hence aid in electro-oxidation process.

Preferably the present invention can include one or more reactors comprising a liquid containing vessel and one or more pairs of electrodes. The electrodes can be preferably coated with mixed oxides, Nobel metals and/or boron doped diamond electrodes. A power source for each reactor can be provided which supplies voltage and current to the electrodes. A controller can be provided for switching and regulating the voltage and current to the electrodes, such that the polarity of the electrodes can be reversed at controlled intervals.

The electrolysis of fluid takes place at the cathode and anode. At the cathode hydrogen gas can be liberated to generate a hydroxide group and raising the pH of the water locally. The formation of OH—radical at the cathode reacts with the organic and inorganic compounds and, thus, accelerates the oxidation reaction.

The polarity of the electrodes can be periodically reversed to mitigate electrode surface scaling.

Oxidant gas can be injected, preferably through a Venturi configuration, and mixed with the incoming influent. The influent mixed with the oxidant gas bubbles discharges into the reactor through one or multiple nozzles preferably arranged in a circular array. The array of nozzles directs the influent flow preferably into the center of the reactor where the high turbulence energy dissipation is achieved. The oxidant gas bubbles are subjected to pressure and velocity variation where they collapse causing the phenomenon called sonoluminescence.

The introduction of an oxidizing agent through the discharge nozzles into the reactor forms a cavitation of nano bubbles by hydrodynamic cavitation in a low-pressure zone. These nano gas bubbles collapse/implode as they pass through increase pressure zone(s). Collapsing of the cavitation bubbles may produce ultraviolet oxidation of organic substance in the fluid. The collapsing of the cavitation bubbles can create a high-energy condition like ultraviolet light, shearing, high pressure, heat, mechanical vibration, noise etc.

DETAIL DESCRIPTION OF THE INVENTION

Figure 1:
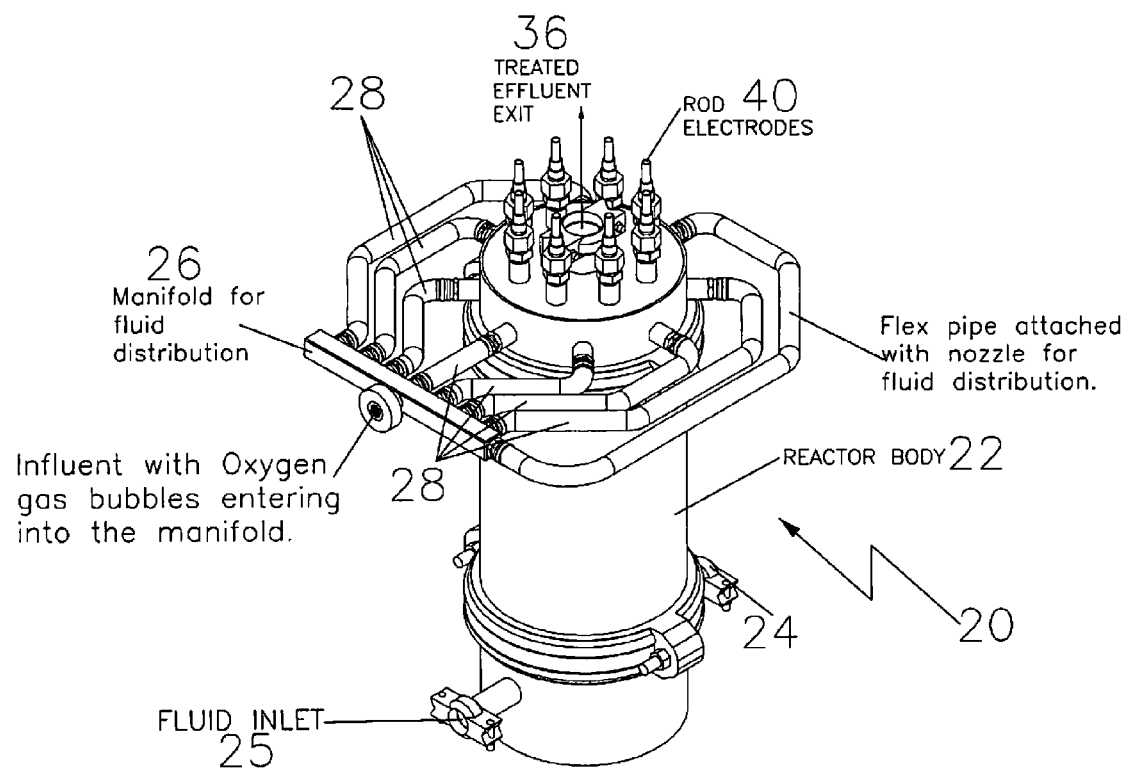
FIG. 1 is a perspective view of an Electro-chemical cell reactor showing various features in accordance with the present invention.

As in FIG. 1 the Electro-chemical cell reactor in accordance with the present invention is shown and generally designated as electro-chemical cell reactor 20. Preferably, reactor 20 can be a pressure vessel with one or more electrodes 40 and a nozzle assembly attached or otherwise secured to it. Raw influent to be treated preferably enters from or near the bottom of the reactor body 22 such as, but not limited to, through a raw fluid inlet 24 and raw fluid outlet 25. An internal divider 27 can be provided within reactor body 22 for separating or isolating the raw fluid passageway area (bottom chamber) 29 preferably at the bottom of reactor body 22 and the treating area (top chamber) 30 within reactor body 22 from each other. Reactor body 22 can be preferably cylindrical in shape and can be installed vertically or horizontally depending on the layout of the system which electro-chemical cell reactor 20 is associated with or part of. A strainer screen or other type of filter can be disposed within bottom chamber 29 and/or at raw fluid inlet 24 and/or raw fluid outlet 25 to filter out bigger size particles before they reach booster pump 64.

As will be discussed with FIG. 2, after leaving raw fluid outlet 25 the raw fluid is preferably mixed with oxidant gas. The influent with mixed with oxidant gas is then pumped into a manifold 26. Manifold 26 is preferably on or near the top part of reactor body 22 and is used for fluid distribution. Multiple piping outlets 28 serve as inlets for the influent with mixed oxidant to direct the mixed oxidant influent into treating area 30 of reactor body 22 and facilitate the distribution of pressurized fluid into the reactor through the use of a nozzle 32 at the end of each piping outlet 28 which is in communication with treating area 30. The number of nozzles/piping outlets 28 is not considered limited to any particular number and varying number of nozzle/piping outlets 28 can be used and are considered within the scope of the invention.

One or more rod electrodes 40 can be installed and positioned within treating area 30 and in embodiment can be installed vertically from topside of reactor body 22. Preferably the anodes of rod electrodes 40 can be insulated through gland nuts and do not touch reactor body 22. Electrodes 40 can be connected to a single power supply 50 or multiple power supplies where their polarity can be preferably changed at certain fixed intervals.

An outlet pipe 36 can be substantially positioned within treating area 30 and can be preferably centrally or substantially centrally positioned with respect to reactor body 22 and serves as the discharge route or exit for the treated effluent.

Figure 2:
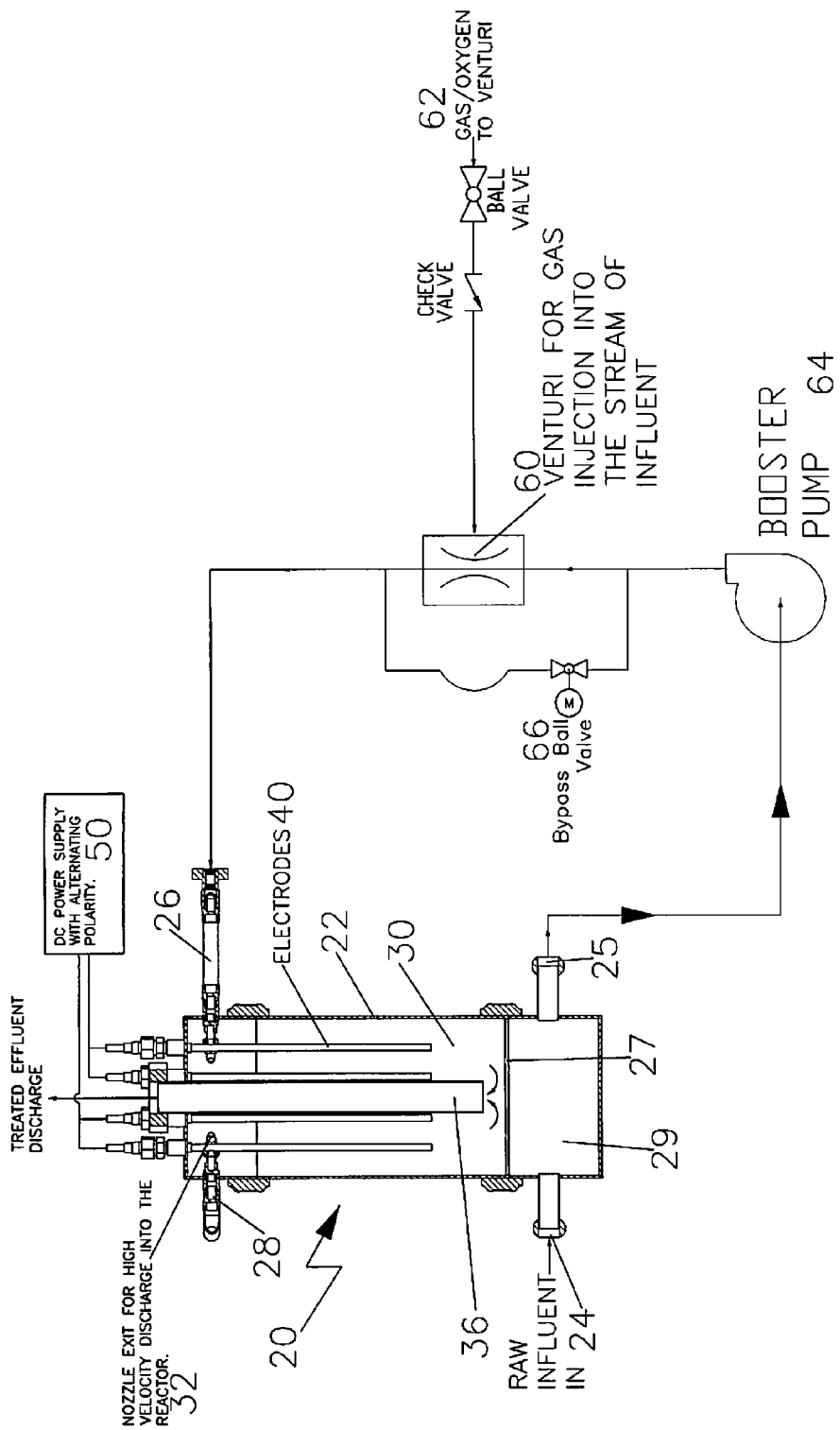
FIG. 2 illustrates a block diagram for a piping layout in accordance with the present invention where the influent is mixed with the oxidant gas preferably using a venturi set up.

FIG. 2 illustrates the piping layout where the influent can be mixed with oxidant gas 62 preferably using a venturi 60 set up. A booster pump 64 can be provided to raise the pressure of the incoming influent and then passed the influent through the venturi. Bottom chamber 29 preferably receives the influent in and then passes the influent on to booster pump 64. If the incoming flow has a higher pressure flow, greater than the limitation of booster pump 64, pressure relief valves and a bypass line from bottom chamber 29 to reactor 20 can be provided to balance the flow of influent. In an alternative embodiment, bottom chamber 29 is eliminated and the raw fluid can be directly fed or diverted to booster pump 64 and/or venturi 60.

A bypass valve 66, preferably a ball valve, can be provided for maintaining the required pressure drop across the venturi for optimizing the highest possible mass transfer efficiency. The pressure difference across venturi 60 defines a vacuum and hence allows the volume of oxidant gas from gas source 62 that is required for the treatment injected into the stream of influent to be treated that is traveling through the system. The influent mixed with the oxidant gas can then be pumped or otherwise directed into manifold 26. Manifold 26, with its plurality of outlets 28/nozzles 32, can be provided to facilitate the distribution of the high-pressure oxidant gas mixed influent into treating area 30 of reactor body 30.

Figure 3:
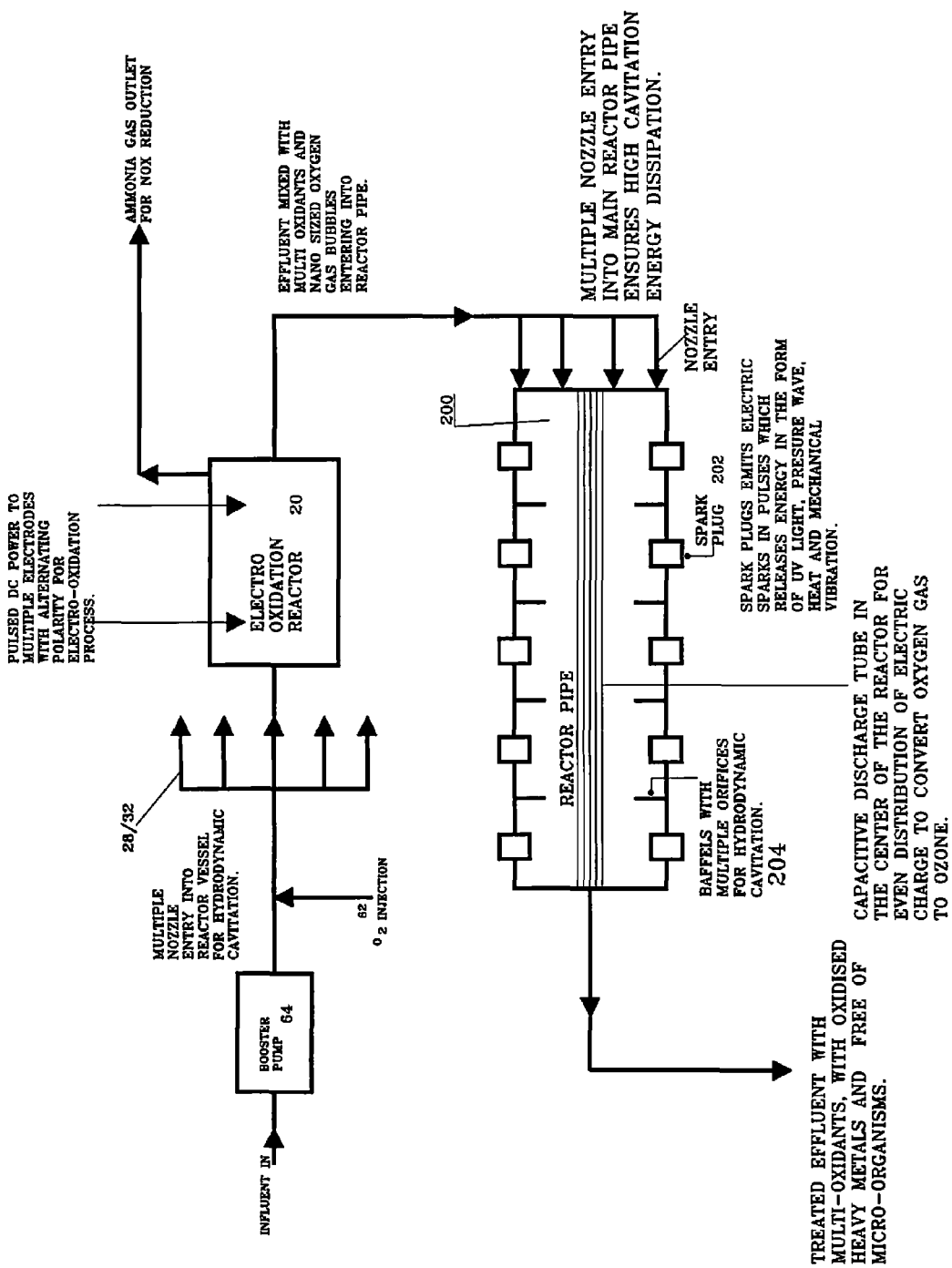
FIG. 3 illustrates a block diagram of water treatment apparatus using the present invention Electrolytic cell and a reactor pipe with spark plugs.
Figure 4:
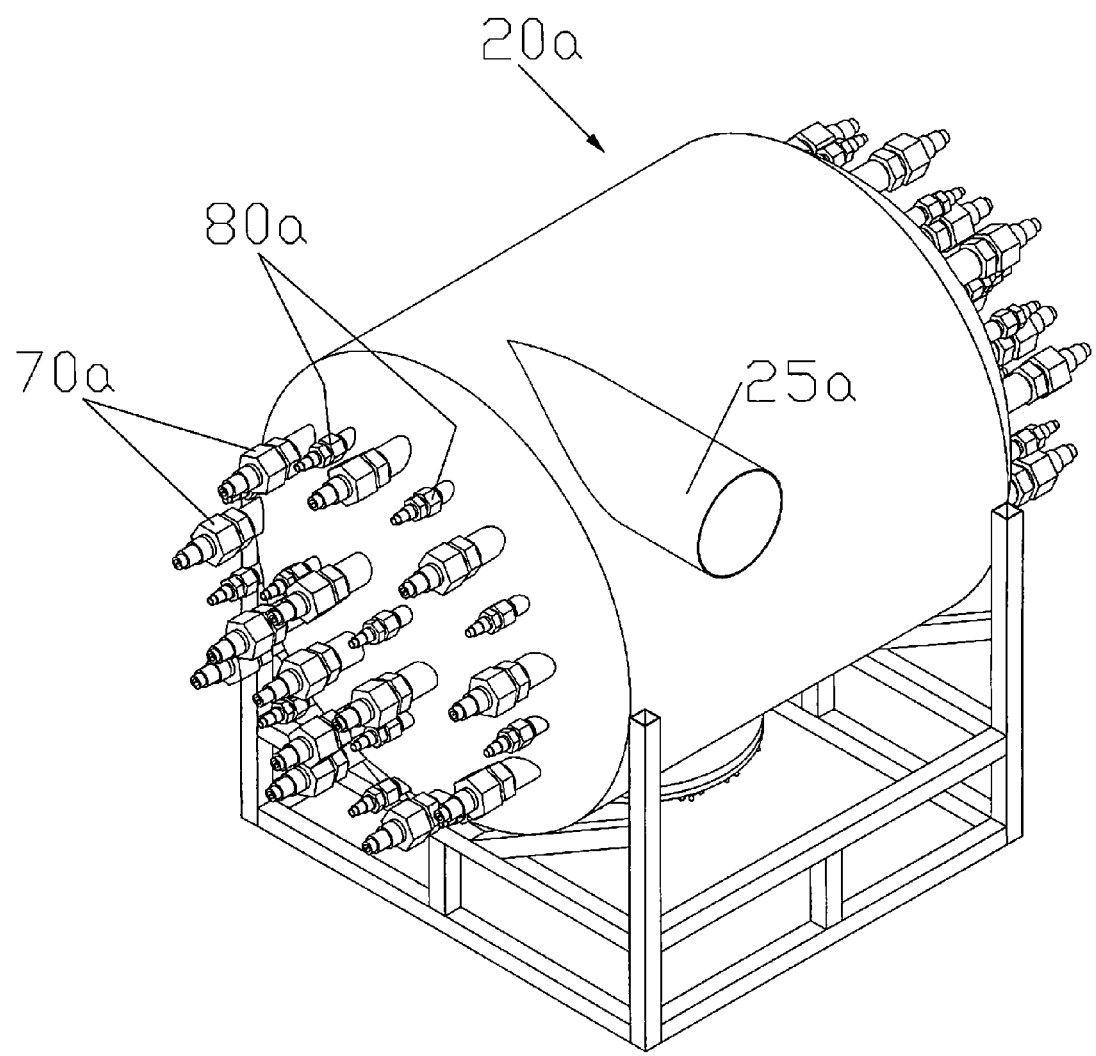
FIG. 4 illustrates a perspective view for another type of electrolytic cell configuration where the Capacitive Discharge tubes and rod anodes can be arranged in the circular manner in the chamber.
Figure 5:
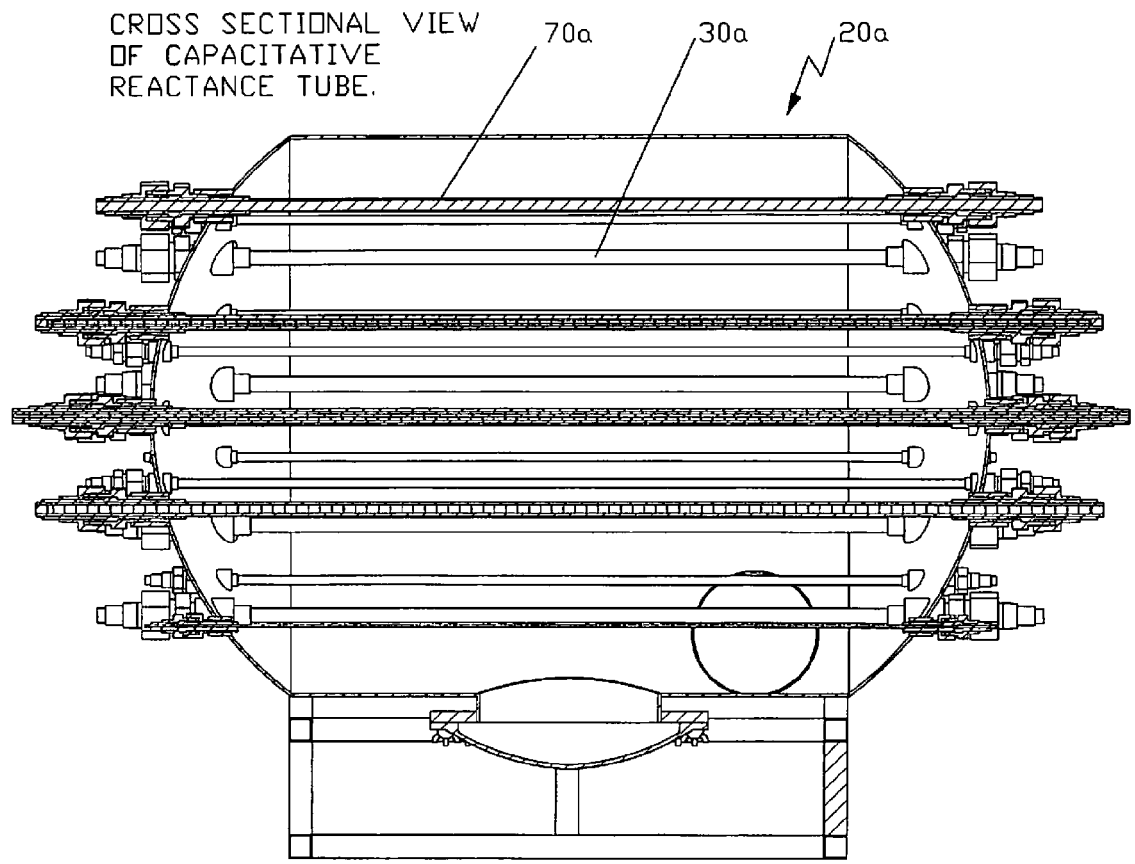
FIGS. 5 and 6 illustrate the front and top cross-sectional views, respectively, of the electrolytic cell showing one non-limiting arrangement of rod anodes and capacitive discharge tube in accordance with the present invention.
Figure 6:
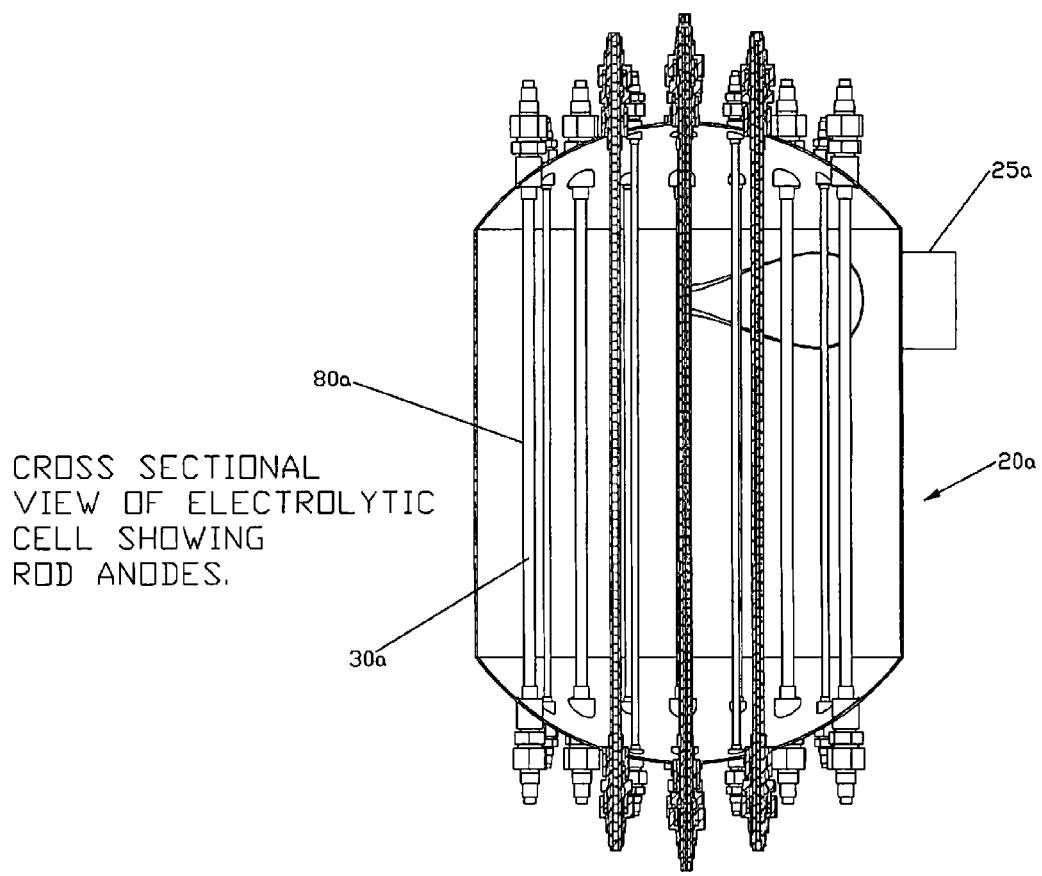
Figure 7:
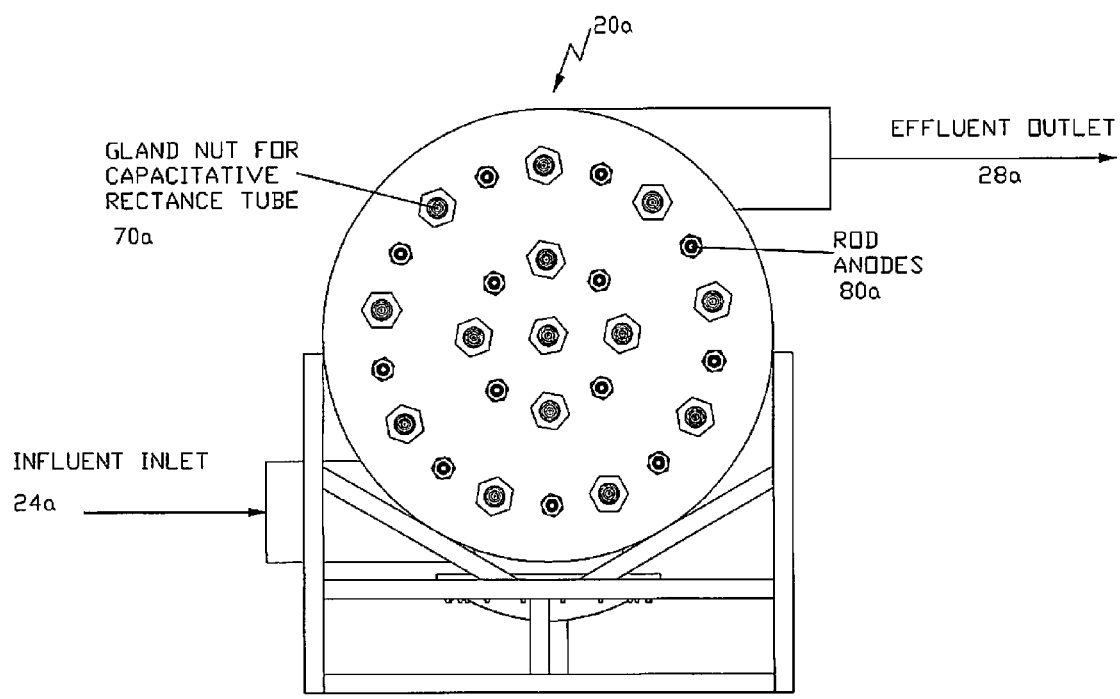
FIG. 7 illustrates a side elevational view of the present invention electrolytic cell showing non-limiting locations for the influent inlet and effluent and also showing a non-limiting arrangement of rod anodes and high voltage capacitive discharge tube.

FIG. 3 illustrates a block diagram of water treatment apparatus incorporating electrolytic cell 20 and a reactor pipe 200 with spark plugs 202 which is discussed in more detail in our co-pending U.S. application Ser. No. 13/252,198 filed Oct. 4, 2011, which is incorporated by reference in its entirety.

In use, influent can enter into the process through booster pump 64 where it can be preferably mixed with oxidant gas 62 e.g. ozone, oxygen etc. preferably using a venture 60 configuration. Influent intake can preferably be through booster pump 64. The influent pressure can be raised and processed through the system. A higher-pressure difference across the venturi creates the vacuum allowing oxidant gas 62 to mix well with the influent stream. Pressurized influent mixed with the oxidants can then be preferably discharged into treating area 30 of reactor 20 preferably through a series of piping 28/nozzles 32. The series of nozzles 32 can be preferably directed towards the center of reactor 20. As the influent, preferably mixed with the oxidant gas, is exited out of the nozzles, large cavitation energy dissipation occurs.

In connection with electrolytic reactor cell 20 electrodes 40 are preferably connected to DC power supply 50 where pulsed DC power supply 50 provides pulsed DC power into the water through one or more electrodes 40. The electro chemical oxidation using inert electrodes 40 can take place through two mechanisms: 1) direct oxidation where pollutant is destroyed at the anode surface; and 2) indirect oxidation where a mediator is electrochemically generated to carry out the oxidation.

The mass transfer from the bulk solution to the electrode surface takes place, and then homogenous or heterogeneous chemical reactions occur at the electrode surface. These reactions are followed by the electron transfer at the electrode surface. Finally, the mass transfer of electrons from the electrode surface to the bulk solution occurs.

The rate of the electron transfer is governed by the electrode activity and the current density whereas the extent of the mass transfer will be controlled by the turbulence in the reactor vessel. The ammonia gas release through electro-oxidation process can then be vented out to use for NOX reduction in exhaust fluent gases (See FIG. 3).

After that the effluent is pumped into reactor pipe 200 it can be passed through series of baffles 204. Baffles are primarily provided for two purposes: (1) to harness the potential energy of the pressure head and velocity into the hydrodynamic cavitation, and (2) for the efficient mixing of oxidant gas nano bubbles with the effluent. The pressure velocity relation of the flowing fluid is used to create the hydrodynamic cavitation. At each orifice hole in baffles 204, the kinetic energy of the liquid increases at the expense of the pressure head, causing the pressure around the orifices to drop below the threshold pressure for hydrodynamic cavitation. Subsequently as the liquid jet expands, the pressure increases resulting in the collapse of the gas bubbles. During the passage of the effluent through the multiple orifices, boundary layer separation occurs and high turbulent energy dissipation can be observed downstream.

Three prong spark plugs 202 can be installed on reactor pipe 200 for releasing a spark in the effluent using a pulse voltage generator. The pulse voltage generator with high voltage discharge is considered to overcome the die-electric resistance of the effluent. The pulse voltage generator establishes the sparks in the effluent and a gas solenoid valve synchronizes the pulsation and discharges the oxidant gas in the effluent. The gas bubble which can be trapped in the middle of the spark implodes and the oxidant gas nano bubbles are then converted into multiple oxidants like O3, OH—, HO2, H2O2 and O. These super oxidants are then utilized to oxidize the contaminants present in the effluent.

The UV light emitted by the spark plug in the effluent helps in the disinfection process and to sterilize the effluent. The preferred pulse mode of the spark in the effluent generates the sonic waves in the effluent. The subsequent compression and rarefaction cycle of the sound waves causes the bubbles to expand and collapse releasing large amount of energy in the form of heat, UV light, mechanical vibration, and shear. This form of energy can be utilized for oxidation and sterilization of the effluent. Preferably the pulse generator matches the frequency of the oxidant gas discharge into the effluent with the spark pulse generator. A compressed gas tank stores the gas for the process and acts as an accumulator.

FIGS. 4-7 illustrate another type of electrolytic cell 20*a* which can be used in accordance with the present invention. In this embodiment, capacitive reactance tubes 70*a* and rod anodes 80*a* can be provided and can be preferably arranged in a circular manner within the treating chamber 30*a* of electrolytic cell 20*a*. Preferably, influent enters radially from the bottom of electrolytic cell 20*a* through influent inlet 24*a* and exits from the top of electrolytic cell 20*a* through effluent outlet 25*a*. The preferred arrangement of capacitive reactance tubes 70*a* and rod anodes 80*a* is also illustrated in the Figures. However, such arrangement is not considered limiting.

Figure 8:
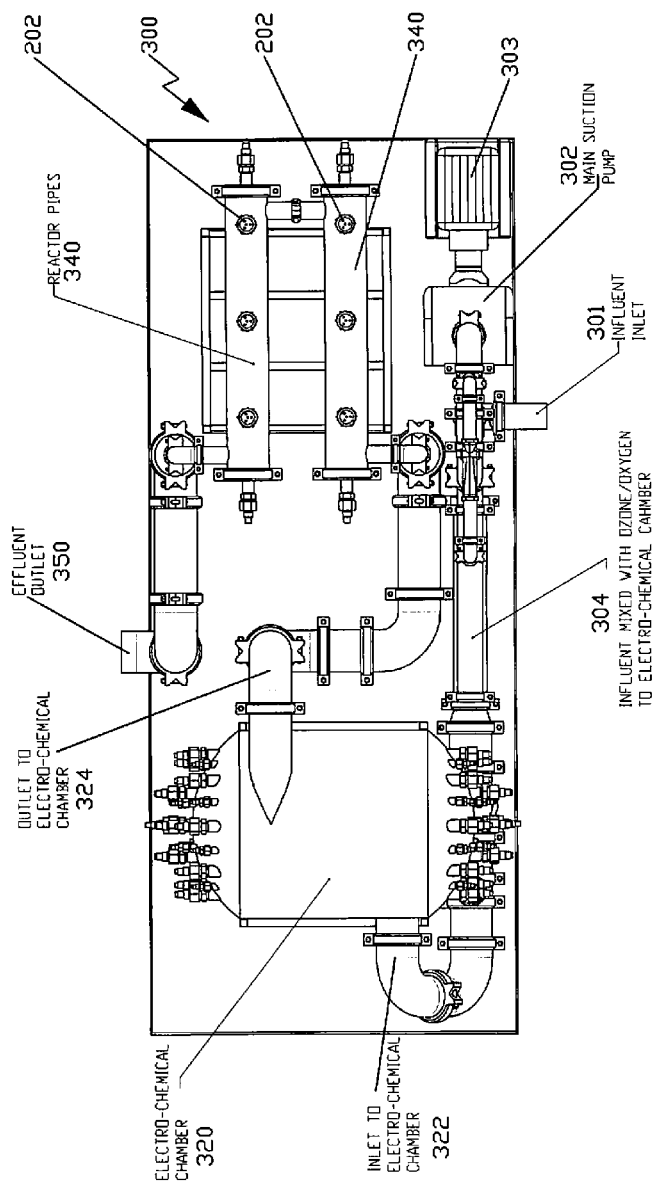
FIGS. 8-10 illustrate several views of an advanced oxidation configuration using an electro-chemical chamber in accordance with the present invention and a reactor pipe.
Figure 9:
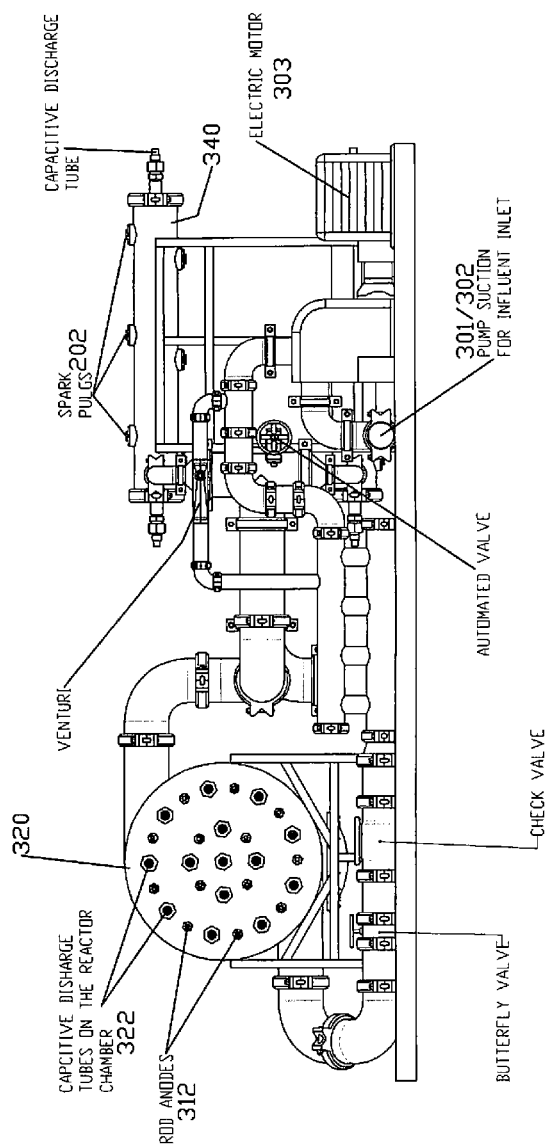
Figure 10:
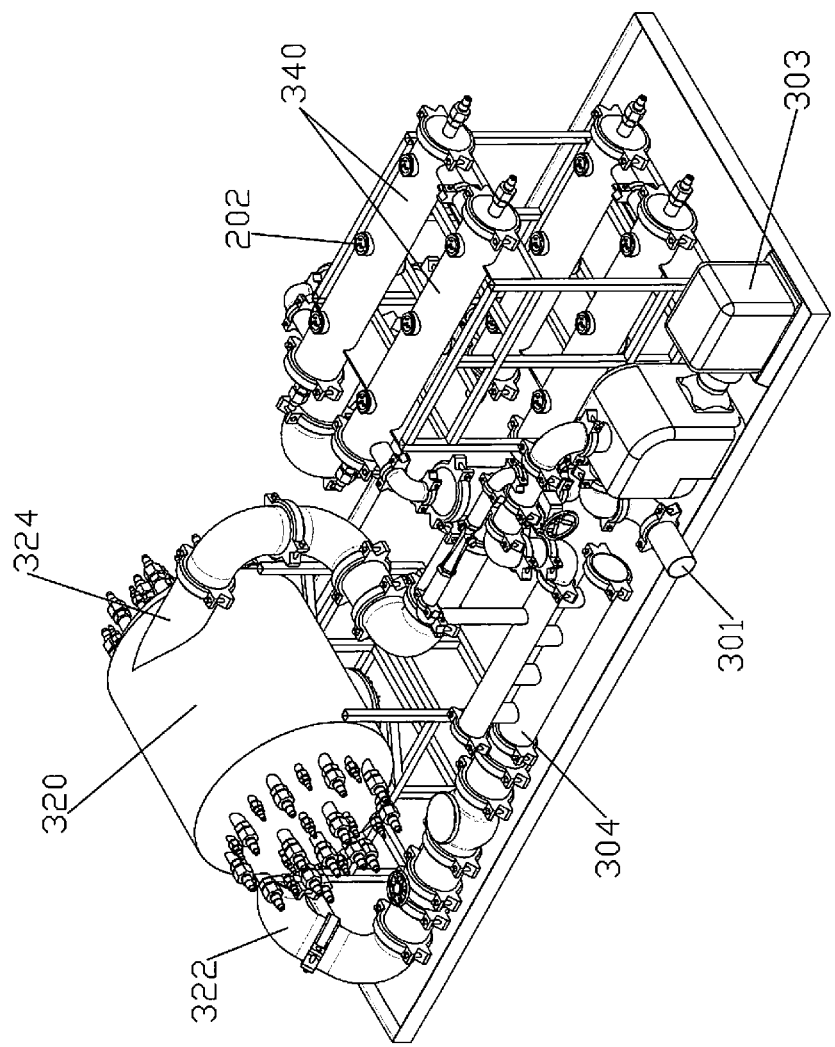

FIGS. 8-10 illustrate different views of an advanced oxidation process and system 300 using an electro-chemical chamber 20/20*a* and reactor pipe 200 in accordance with the teachings of the present invention.

Initially, influent enters into the system through inlet 301 in connection with main suction pump 302 and motor 303. The discharge main suction pump 302 is then preferably distributed into two streams, one through venturi and the other through a bypass line with automated valve. The automated bypass valve maintains the required pressure across the venturi for mixing the right amount of oxidant gas like ozone and oxygen into the stream of influent.

Influent mixed with Oxidant gas then discharged into main pipe 304 through multiple nozzles. These nozzles are meant to achieve highest possible cavitation energy dissipation in the main pipe. Nozzles are used to increase the velocity of effluent entering into main pipe. The higher exit velocity means higher Reynolds number and hence higher turbulence energy dissipation.

Advantages of using Nozzles include, but are not limited to:
1) Dynamic mixing under pressure yields greater mass transfer
2) Provides desirable backpressure to the venturi injector.
3) A larger dose of oxidant gas is possible.

As the Cavitation Energy dissipation allows the formation, growth and subsequent collapse of micro bubbles or cavities occurs in an extremely small interval of time (milliseconds) releasing large magnitudes of energy. The release of energy is over a very small pocket, and cavitation events occur at multiple locations simultaneously. The overall effects are generation of hot spots, release of highly reactive free radicals, continuous cleaning as well as increase in the surface area of the solid catalysts, and enhancement in the mass transfer rates.

The mechanism of cavitation phenomena has been mainly attributed to the mechanical effects viz. generation of turbulence, liquid circulation currents and shear stresses, supplemented by the chemical effects (generation of active free radicals) and heat effects (generation of local hot spots i.e. condition of very high temperature) These localized high energy conditions results in the formation of highly reactive free radicals facilitating the breakdown of the organic substances and can also result in the disinfection of microorganisms present in the effluent stream.

Effluent mixed with multi-oxidants then enters radially into the Electro-Chemical chamber through inlet 322. Electro-Chemical Chamber can consist of rod anodes 312 and capacitive discharge Tubes 332 similar to electrolytic cell 20*a* (FIGS. 4-7). Rod anodes 312 release DC current in the effluent. The electrodes can be coated with mixed oxides, Nobel metals and/or boron doped diamond electrodes.

The following reaction takes place at the cathode and anode:

(i) Reactions expected at Cathode:

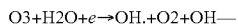
$$O3+H2O+e \rightarrow OH.+O2+OH—$$

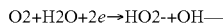
$$O2+H2O+2e \rightarrow HO2-+OH—$$

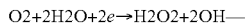
$$O2+2H2O+2e \rightarrow H2O2+2OH—$$

(ii) Reactions expected at Anode:

$$3OH— \rightarrow HO2-+H2O+2e$$

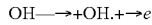
$$OH— \rightarrow +OH.+ \rightarrow e$$

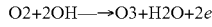
$$O2+2OH— \rightarrow O3+H2O+2e$$

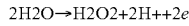
$$2H2O \rightarrow H2O2+2H++2e$$

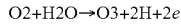
$$O2+H2O \rightarrow O3+2H+2e$$

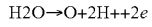
$$H2O \rightarrow O+2H++2e$$

The turbulent flow through system 300 aids in efficient electron migration between anode and cathode. These electrodes are non-active electrodes where the anode material acts as a catalyst and hydroxyl radicals that are generated at the electrode surface assist the oxidation process.

Preferably and as shown, there can be multiple capacitive discharge tubes 332 contained within Electro-chemical Chamber 320. Capacitive discharge tubes 332 preferably contain an outer quartz tube, which can withstand the hydraulic pressure of the effluent. In the center of the quartz tube can be housed a corona discharge electrode. The corona discharge electrode causes a transient high-pressure glow discharge. When a dielectric-barrier discharge is operated in a corona discharge electrode having rare gas (Xenon), plasma conditions in micro-discharge channels are formed and act as an intense source of Ultraviolet. As contaminants are subjected to the super oxidants in electro-chemical chamber 320, effluent is sterilized by oxidizing the colonies of the bacteria. Inorganic contaminants are oxidised to their inert form.

The capacitive discharge tubes 322 can be structured similar and operate similar to the capacitive discharge tube 80 described in our co-pending application Ser. No. 13/252,198 filed Oct. 4, 2011, which is incorporated by reference in its entirety.

Divalent cations which are very detrimental in forming scale are encouraged to precipitate by providing electrons and anions in the electro-chemical process. After precipitation these precipitated scale particles are chemically inert and remain in suspension.

After being treated within electrochemical chamber 320, effluent exits out of outlet 324 and can preferably be passed or directed through one or more, and preferably two sets of, reactor pipes 340. Each reactor pipe 340 can be similar to reactor pipe 200 discussed above and can contain a series of baffles and a plurality of spark plugs 202. Spark plugs 202 release high voltage pulse in the water, which in turn allows effluent saturated with oxygen, to produce ozone and hydroxyl radicals. These oxidants, which are produced, are then utilised to oxidise the contaminants.

The discharge from reactor pipe(s) 340 is coupled together to a common discharge line and ultimately exited out of system 300 through effluent outlet 350.

Certain features, benefits and/or advantages of the present invention, include, but are not limited to the following:

1. An electro-chemical reactor to removed organic contamination and hardness from aqueous solutions using:

(a) an aqueous foam generator for creating micro sized bubbles from oxygen and ozone gases at foam qualities between about 10 and about 30 percent;

(b) Rod anodes with Platinum, DSA (Dimensionally stable anodes (Electrodes)), or boron doped diamond with a metal walled vessel for cathode current return;

(c) Capacitate discharge tube lamps containing mercury or deuterium vapor for pulsed UVC light generation;

(d) a resident time between one and three minutes to complete oxidation and precipitation reactions.

2. Using the apparatus in benefit 1, oxidizing recalerent organic compounds using a pulsed discharge electrode in oxygen foam with:

(a) Voltage exceeding about 50 kV, (b) Discharge cathode surround by oxygen gas envelope in aqueous solution, (c) At least two return anodes to cycle discharge pluses.

All locations, sizes, shapes, measurements, amounts, angles, voltages, frequencies, component or part locations, configurations, temperatures, weights, dimensions, values, percentages, materials, orientations, etc. discussed above or shown in the drawings are merely by way of example and are not considered limiting and other locations, sizes, shapes, measurements, amounts, angles, voltages, frequencies, component or part locations, configurations, temperatures, weights, dimensions, values, percentages, materials, orientations etc. can be chosen and used and all are considered within the scope of the invention.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function (s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A system for treatment of an influent, said system comprising:

an electro-chemical cell reactor defining a treatment area within, said treatment area having a first end and a second end and said treatment area cylindrically shaped from said first end to said second end;

one or more rod electrodes operatively disposed within said treatment area of said electro-chemical cell reactor, a first end of each of said one or more rod electrodes extending outward and externally located with respect to said electro-chemical cell reactor at the first end of the treatment area, each of said one or more rod electrodes having, a polarity, said first ends of said one or more rod electrodes assembled in a circular array, each of said one or more rod electrodes having an unsupported second end disposed within the treatment area and terminating prior to reaching the second end of the treatment area, said second end of each rod electrode disposed within the treatment area without contacting any portion of the electro-chemical cell reactor wall, each of said rod electrodes having a circular cross-sectional shape;

a manifold located external to the electro-chemical cell reactor, said manifold having an internal passageway, a plurality of pipes, each of said plurality of pipes having a first end and a second end and having an internal passageway extending from the first end to the second end, the first end of each of said plurality of pipes connected to the manifold such that the manifold internal passageway is in communication with the internal passageway of each of said plurality of pipes outside of electro-chemical cell reactor;

a plurality of inlet nozzles, each of said plurality of inlet nozzles secured to the second end of a corresponding pipe of said plurality of said pipes, each of said nozzles having an outer outlet end that: is disposed within the treatment area of the electro-chemical cell reactor for delivering influent under high pressure into the treatment area, said nozzles pointed towards a center area of the treatment area to create random turbulence; and at least one power supply in electrical communication with said one or more rod electrodes, wherein said at least one power supply having alternating polarity such that said one or more electrodes are either positive anodes or negative cathodes depending on the polarity of the at least one power supply.

2. The system for treatment of an influent of claim 1 wherein said plurality of inlet nozzles positioned in a circular nozzle array with respect to the electro-chemical cell reactor; wherein said manifold in communication with an influent line which upon receipt of influent by the manifold from the influent line said influent is divided and distributed through said plurality of inlet nozzles and delivered under high pressure into the treatment area wherein said inlet nozzles are positioned such that they provide for substantially perpendicular entry of the influent with respect to the one or more rod electrodes.

3. The system for treatment of an influent of claim 1 wherein said plurality of inlet nozzles are positioned near the first end of the treatment area; wherein said electro-chemical cell reactor defining a raw influent passageway at the bottom area of said electro-chemical cell reactor, said raw influent passageway adjacent to the second end of the treatment area, said raw influent passageway separate and isolated from said treatment area with in said electro-chemical cell reactor wall.

4. The system for treatment of an influent of claim 1 further comprising a source of ionized gas or oxygen gas and a venturi configuration, said venturi configuration in communication with an influent inlet line and in communication with the source of ionized gas or oxygen gas, wherein said venturi configuration injects the source of gas or Oxygen into a stream of received influent to provide for a mixed oxidant influent that is provided into the treatment area through the plurality of nozzles.

5. The system for treatment of an influent of claim 3 further comprising a source of ionized gas or oxygen gas and a venturi configuration, said venturi configuration in communication with an influent outlet of said raw influent passageway and in communication with the source of gas or oxygen, wherein said venturi configuration injects the source of ionized gas or oxygen gas into a stream of received influent received from said raw influent passageway to provide for a mixed oxidant influent that is provided into the treatment area through the plurality of nozzles, wherein said venturi configuration creates micro sized bubbles from ionized gas or oxygen was at foam qualities between about 10 percent to about 30 percent in the influent.

6. The system for treatment of an influent of claim 1 wherein said at least one power supply is at least one DC power supply having a polarity.

7. The system for treatment of an influent of claim 6 wherein the DC power supply polarity is periodically alternated which causes the polarity of each of the electrodes to be periodically reversed in order to mitigate electrode surface scaling and fouling.

8. The system for treatment of an influent of claim 1 wherein said plurality of nozzles comprises at least four nozzles positioned in a circular array with respect to said electro-chemical cell reactor.

9. The system for treatment of an influent of claim 1 further comprising one or more capacitive discharge tubes operatively disposed within said treatment area, a first end of each of said one or more capacitive discharge tubes extending outward and externally located with respect to said electro-chemical cell reactor, said one or more capacitive discharge tubes receiving high voltage pulsed DC current such that an outer surface of each of said one or more capacitive discharge tubes becoming charged, each of said one or more capacitive discharge tubes having an outer quartz tube and a centrally disposed corona discharge electrode contained within the outer quartz tube, said corona discharge electrode having multiple bristles.

10. The system for treatment of an influent of claim 9 wherein said one or more capacitive discharge tubes is a plurality of discharge tubes and said one or more rod electrodes is a plurality of rod electrodes; wherein said plurality of capacitive discharge tubes and said plurality of rod electrodes are positioned with respect to said electro-chemical reactor cell such that they form an outer circular array and an inner circular array; wherein the capacitive discharge tube is used to ionize gas used in an oxidation process and produce ultraviolet light to catalyze reactions in the electro-chemical reactor.

11. The system for treatment of claim 1 wherein the rod electrodes are coated with mixed oxides, noble metals or boron doped diamond electrode coatings.

12. The system for treatment of claim 1 wherein said electro-chemical reactor cell having a reactor exit pipe centrally disposed within the treatment area between the one or more electrodes, said reactor exit pipe having an inlet end and an outlet end, said inlet end of said reactor exit pipe extending beyond the second ends of the one or more rod electrodes and closer to the second end of the treatment area as compared to the second ends of the one or more rod electrodes, said outlet end of said reactor exit pipe extending outward and externally located with respect to said electro-chemical cell reactor at the first end of the treatment area.

13. A system for treatment of an influent, said system comprising:
an electro-chemical cell reactor defining a treatment area within, said treatment area having a first end and a second end and said treatment area cylindrically shaved from said first end to said second end such that said treatment area has a same diameter from said first end to said second end;
a plurality of rod electrodes and a plurality of capacitive discharge tubes operatively disposed within said treatment area, a first end of each of said plurality of rod electrodes and a first end of each of said plurality of capacitive discharge tubes extending outward and externally located with respect to said electro-chemical cell reactor at the first end of the treatment area, each of said plurality of rod electrodes having a polarity, said first ends of said one or more rod electrodes assembled in a circular array, each of said one or more rod electrodes having an unsupported second end disposed within the treatment area and terminating prior to reaching the second end of the treatment area, said second end of each rod electrode disposed within the treatment area without contacting any portion of the electro-chemical cell reactor, each of said rod electrodes having a circular cross-sectional shape each of said one or more capacitive discharge tubes having an outer quartz tube and a centrally disposed corona discharge electrode contained within the outer quartz tube, said corona discharge electrode having multiple bristles;
a manifold located external to the electro-chemical cell reactor, said manifold having an internal passageway,
a plurality of pipes, each of said plurality of pipes having a first end and a second end and having an internal passageway extending from the first end to the second end, the first end of each of said plurality of pipes connected to the manifold such that the manifold internal passageway is in communication with the internal passageway of each of said plurality of pipes outside of electro-chemical cell reactor;
a plurality of inlet nozzles, each of said plurality of inlet nozzles secured to the second end of a corresponding pipe of said plurality of said pipes, each of said nozzles having an outer outlet end that is disposed within the treatment area of the electro-chemical cell reactor for delivering influent under high pressure into the treatment area, said nozzles pointed towards a center area of the treatment area to create random turbulence; and
at least one DC power supply having a polarity in electrical communication with said plurality of rod electrodes and said plurality of capacitive discharge tubes;
wherein said one or more capacitive discharge tubes receiving high voltage pulsed DC current such that an outer surface of each of said one or more capacitive discharge tubes becoming charged.

14. The system for treatment of an influent of claim 13 wherein said plurality of inlet nozzles positioned in a circular nozzle array with respect to the electro-chemical cell reactor wherein said manifold in communication with an influent line, wherein upon receipt of influent by the manifold from the influent line said influent is divided and distributed through said plurality of inlet nozzles and delivered under high pressure into the treatment area; wherein said inlet nozzles are positioned such that they provide for substantially perpendicular entry of the influent with respect to the one or more rod electrodes.

15. The system for treatment of an influent of claim 14 wherein said plurality of nozzles comprises at least four nozzles positioned in a circular array with respect to said electro-chemical cell reactor.

16. The system for treatment of an influent of claim 13 wherein said plurality of inlet nozzles are positioned near the first end of the treatment area; wherein said electro-chemical cell reactor defining a raw influent passageway at the bottom area of said electro-chemical cell reactor, said raw influent passageway adjacent to the second end of the treatment area, said raw influent passageway separate and isolated from said treatment area within said electro-chemical cell reactor.

17. The system for treatment of an influent of claim 16 further comprising a source of ionized gas or oxygen gas and a venturi configuration, said venturi configuration in communication with an influent outlet of said raw influent passageway and in communication with the source of gas or oxygen, wherein said venturi configuration injects the source of ionized gas or oxygen gas into a stream of received influent received from said raw influent passageway to provide for a mixed oxidant influent that is provided into the treatment area through the plurality of nozzles, wherein said venturi configuration creates micro sized bubbles from ionized teas or oxen as at foam qualities between about 10 percent to about 30 percent in the influent.

18. The system for treatment of an influent of claim 13 further comprising a source of ionized gas or oxygen gas and a venturi configuration, said venturi configuration in communication with an influent inlet line and in communication with the source of ionized gas or oxygen gas, wherein said venturi configuration injects the source of gas or oxygen into a stream of received influent to provide for a mixed oxidant influent that is provided into the treatment area through the plurality of nozzles, wherein said venturi configuration creates micro sized bubbles from ionized gas or oxygen gas at foam qualities between about 10 percent to about 30 percent in the influent.

19. The system for treatment of an influent of claim 13 wherein the DC power supply polarity is periodically alternated which causes the polarity of each of the electrodes to be periodically reversed in order to mitigate electrode surface scaling and fouling.

20. The system for treatment of an influent of claim 13 wherein said plurality of capacitive discharge tubes and said plurality of rod electrodes are positioned with respect to said electro-chemical reactor cell such that they form an outer circular array and an inner circular array.

* * * * *